(12) United States Patent
Reinertsen (10) Patent No.: US 7,464,226 B2
(45) Date of Patent: Dec. 9, 2008

(54) FRACTIONAL CACHING

(76) Inventor: Lars Andreas Reinertsen, Stabburfaret 1, 1350 Lommedalen (NO)

( * ) Notice: Subject to any disclaimer, the term of this patent is extended or adjusted under 35 U.S.C. 154(b) by 332 days.

(21) Appl. No.: 11/360,778

(22) Filed: Feb. 23, 2006

(65) Prior Publication Data

US 2007/0198777 A1    Aug. 23, 2007

(51) Int. Cl.
| G06F 12/00 | (2006.01) |
| G06F 13/00 | (2006.01) |
| G06F 13/28 | (2006.01) |
| G06F 15/16 | (2006.01) |
| G06F 17/00 | (2006.01) |
| G06F 17/20 | (2006.01) |
| G06F 17/21 | (2006.01) |
| G06F 17/22 | (2006.01) |
| G06F 17/24 | (2006.01) |
| G06F 17/25 | (2006.01) |
| G06F 17/26 | (2006.01) |
| G06F 17/27 | (2006.01) |
| G06F 17/28 | (2006.01) |

(52) U.S. Cl. .................. 711/118; 711/133; 711/138; 709/203; 709/217; 715/239

(58) Field of Classification Search .................. 711/138
See application file for complete search history.

(56) References Cited

U.S. PATENT DOCUMENTS

| 7,284,093 | B2 | 10/2007 | Presler-Marshall | |
| 7,308,474 | B2 * | 12/2007 | Chandrasekar et al. | ...... 709/203 |
| 2003/0236857 | A1 * | 12/2003 | Takase et al. | ............... 709/217 |
| 2004/0205694 | A1 | 10/2004 | James et al. | |
| 2005/0102392 | A1 | 5/2005 | Bou-Ghannam et al. | |
| 2007/0174420 | A1 * | 7/2007 | Khusial et al. | ............... 709/217 |

* cited by examiner

*Primary Examiner*—Kevin Ellis
*Assistant Examiner*—Ryan Bertram
(74) *Attorney, Agent, or Firm*—Moore & Hansen, PLLP (57) ABSTRACT

A microprocessor-based system generates an electronic document based on a set of microprocessor-readable instructions organized in logical units known as instruction nodes. Each instruction node includes at least one microprocessor-readable instruction. If an instruction node is eligible for caching, it is associated with a cache key value, which is compared with a cache key value that is stored in a cache memory and that is associated with a data item. If the cache key value associated with the instruction node matches the cache key value stored in the cache memory, the microprocessor-based system retrieves the data item with the cache key value stored in the cache memory, rather than executing the instruction node. The microprocessor-based system generates at least a portion of the electronic document as a function of the retrieved data item.

36 Claims, 8 Drawing Sheets

```
<html>
<title>personalized front page</title>
<body>
This is the front page for all authenticated users.
User belong to different categories and as such will need different types and
quantities of information.
Note that all the HTML is properly XML conformant.
<h2>customized menu</h2>
<pbf:xmlsource name="sql_select" method="sql" >
  <sqlml:database dsn="dbi:DB2:site" dbuser="frontserver"
      dbpwd="password" maxrows="500" desc="local DB2"
      xmlns:sqlml='http://www.org/ZSQL/'>
    <select>
      <field column="timestamp" alias="a" />
      <source table="choices" alias="a" />
      <where>
        <eq>
          <field column="usercategory" alias="a" />
          <value type="string">
            <!-- lookup the category of the user -->
            <pbf:xmlsource name="userinfolookup" returndatatype="xml"
              method="ldap_search">
              <dsml:searchRequest
                  dn="ou=library,o=pbf,c=us"
                  principal="cn=librarian,ou=library,o=pbf,c=us"
                  password="password"
                  hostname="ldaphost"
                  scope="wholeSubtree"
                  derefAliases="neverDerefAliases"
                  sizeLimit="10" >
                <dsml:filter>
                  <dsml:and>
                    <dsml:equalityMatch name="objectclass">
                      <value>webuser</value>
                    </dsml:equalityMatch>
                    <dsml:equalityMatch name="username">
                      <value>
                        <!-- extract user name from cookie -->
                        <pbf:parameter name="uuid"
                            source="httpcookie"
                            name_in_source_if_different="db_uuid"
                            encode="ascii2txt"/>
                      </value>
                    </dsml:equalityMatch>
                  </dsml:and>
                </dsml:filter>
                <dsml:attributes>
                  <dsml:attribute name="usercategory"/>
                </dsml:attributes>
              </dsml:searchRequest>
            </pbf:xmlsource>
          </value>
        </eq>
      </where>
    </select>
  </sqlml:database>
</pbf:xmlsource>
</body>
</html>
```

Fig. 4

```
<html>
<title>personalized front page</title>
<body>
This is the front page for all authenticated users.
User belong to different categories and as such will need different
types and quantities of information.
Note that all the HTML is properly XML conformant.
<h2>customized menu</h2>
<pbf:xmlsource name="sql_select" method="sql" >
   <sqlml:database dsn="dbi:DB2:site" dbuser="frontserver"
       dbpwd="password" maxrows="500" desc="local DB2"
       xmlns:sqlml='http://www.org/ZSQL/'>
     <select>
        <field column="timestamp" alias="a" />
        <source table="choices" alias="a" />
        <where>
           <eq>
              <field column="usercategory" alias="a" />
              <value type="string">
                <!-- lookup the category of the user -->
                <pbf:xmlsource name="userinfolookup" returndatatype="xml"
                   method="ldap_search">
                   <dsml:searchRequest
                      dn="ou=library,o=pbf,c=us"
                      principal="cn=librarian,ou=library,o=pbf,c=us"
                      password="password"
                      hostname="ldaphost"
                      scope="wholeSubtree"
                      derefAliases="neverDerefAliases"
                      sizeLimit="10" >
                     <dsml:filter>
                        <dsml:and>
                           <dsml:equalityMatch name="objectclass">
                              <value>webuser</value>
                           </dsml:equalityMatch>
                           <dsml:equalityMatch name="username">
                              <value>joe_user</value>
                           </dsml:equalityMatch>
                        </dsml:and>
                     </dsml:filter>
                     <dsml:attributes>
                        <dsml:attribute name="usercategory"/>
                     </dsml:attributes>
                   </dsml:searchRequest>
                </pbf:xmlsource>
              </value>
           </eq>
        </where>
     </select>
   </sqlml:database>
</pbf:xmlsource>
</body>
</html>
```

Fig. 5

```
<html>
<title>personalized front page</title>
<body>
This is the front page for all authenticated users.
User belong to different categories and as such will need
different types and quantities of information.
Note that all the HTML is properly XML conformant.
<h2>customized menu</h2>
<pbf:xmlsource name="sql_select" method="sql" >
  <sqlml:database dsn="dbi:DB2:site" dbuser="frontserver"
      dbpwd="password" maxrows="500" desc="local DB2"
      xmlns:sqlml='http://www.org/ZSQL/'>
    <select>
      <field column="timestamp" alias="a" />
      <source table="choices" alias="a" />
      <where>
        <eq>
          <field column="usercategory" alias="a" />
          <value type="string">internal_admin_user</value>
        </eq>
      </where>
    </select>
  </sqlml:database>
</pbf:xmlsource>
</body>
</html>
```

Fig. 6

```
<html>
<title>personalized front page</title>
<body>
This is the front page for all authenticated users.
User belong to different categories and as such will need
different types and quantities of information.
Note that all the HTML is properly XML conformant.
<h2>customized menu</h2>
<h3>Customized title of menu</h3>
More text of a general of tailored nature.
<li>context sensitive menu item1</li>
<li>context sensitive menu item2</li>
<li>context sensitive menu item3</li>
</body>
</html>
```

FRACTIONAL CACHING

TECHNICAL BACKGROUND

The disclosure relates generally to techniques for data organization and presentation. More particularly, the disclosure relates to data caching techniques.

BACKGROUND

In certain computer networks, such as the Internet, information is stored in files known as documents. These documents can be displayed in a user-readable format using a client application known as a browser. When a user accesses a website, for example, the browser sends a request for one or more documents to a web server. The browser then receives the requested documents from the web server and displays the received documents as a page rendered in a browser window. Each page includes at least one document. In the early days of web technology, each document was a static text file stored on the web server in a format known as Hypertext Markup Language (HTML). One limitation of this format is that many types of content are frequently changed or updated. Static text files, however, do not readily lend themselves to such updating. As a result, techniques were created to generate documents dynamically, that is, as and when they were needed.

While some documents are updated relatively frequently, other types of documents are updated infrequently. Some documents are not updated at all. Such documents do not need to be generated very often. Accordingly, the server may store a complete copy of the document so that, rather than generating the document anew each time it is requested, the server can transmit the stored copy of the document to the client computer. This technique is generally known as caching and can be performed in any of a variety of ways well-known to those of skill in the art.

Caching often reduces the amount of time involved in viewing a page. However, in many conventional caching techniques, a document is either entirely cached or not at all cached. Many documents are not cached because the document varies in some respect between different iterations. If the document is not cached, it must be regenerated each time it is requested.

Documents can be dynamically generated using any of a number of technologies, including, but not limited to, compiled languages, scripting languages, JSP, and ASP. These technologies generally involve interpreting or executing a piece of computer programming code to generate a page. The same piece of code may generate different pages, depending on the input parameters that it receives. When the input parameters received by a piece of code varies among only a limited number of possible combinations, some dynamically created pages can be cached. In some cases, however, the input parameters received by a piece of code can vary among a large number of possible combinations, making caching of other dynamically created pages difficult or impossible. In addition, in many programming languages, the same operation can be programmed in several different ways, with several variations of code. As a result, it can be difficult to determine which operations are repetitious merely by inspecting the code. While these determinations can be made at runtime, the code will have already been written at that time, and the results of such repetitious operations are difficult or impossible to cache.

SUMMARY OF THE DISCLOSURE

According to various example embodiments, a microprocessor-based system generates an electronic document based on a set of microprocessor-readable instructions organized in logical units known as instruction nodes. Each instruction node includes at least one microprocessor-readable instruction. If an instruction node is eligible for caching, it is associated with a cache key value, which is compared with a cache key value that is stored in a cache memory and that is associated with a data item. If the cache key value associated with the instruction node matches the cache key value stored in the cache memory, the microprocessor-based system retrieves the data item with the cache key value stored in the cache memory, rather than executing the instruction node. The microprocessor-based system generates at least a portion of the electronic document as a function of the retrieved data item.

One embodiment is directed to a microprocessor-based system for generating an electronic document. The microprocessor-based system comprises a program memory configured to store an instruction node comprising at least one microprocessor-readable instruction. A cache memory is configured to store a cache key value and a data item associated with the stored cache key value. A requester subsystem is configured to receive the instruction node from the program memory. An interpreter subsystem is configured to compare a cache key value associated with the instruction node with a cache key value stored in a cache memory and associated with a data item if the instruction node is eligible for caching. If the cache key value associated with the instruction node matches the cache key value stored in the cache memory, the interpreter subsystem retrieves the data item with the cache key value stored in the cache memory, and generate at least a portion of the electronic document as a function of the retrieved data item. In this way, the interpreter subsystem generates portions of the electronic document that are associated with instruction nodes associated with stored cache key values by retrieving data items from the cache memory rather than executing such instruction nodes.

In another embodiment, an electronic document is generated as a function of a set of microprocessor-readable instructions. An instruction node comprising at least one microprocessor-readable instruction from the set of microprocessor-readable instructions is received. If the instruction node is eligible for caching, a cache key value that is associated with the instruction node is compared with a cache key value stored in a cache memory and associated with a data item. If the cache key value associated with the instruction node matches the cache key value stored in the cache memory, the data item with the cache key value stored in the cache memory is retrieved. At least a portion of the electronic document is generated as a function of the retrieved data item. This method may be embodied via a microprocessor-readable medium containing microprocessor-readable instructions.

Various embodiments may provide certain advantages. For instance, significant improvements in performance, e.g., speed of generating electronic documents, can be realized by storing results from an operation and retrieving those results rather than performing the operation anew. In addition, by caching results of operations or groups of operations rather than entire documents, a greater amount of data may be eligible for caching, thereby potentially improving performance on a broader level than some conventional caching techniques.

Additional objects, advantages, and features will become apparent from the following description and the claims that follow, considered in conjunction with the accompanying drawings.

BRIEF DESCRIPTION OF THE DRAWINGS

FIG. 4 illustrates an example portion of an XML document.

FIG. 5 illustrates the portion of the XML document of FIG. 4 after an instruction node has been replaced with the result obtained by its execution.

DESCRIPTION OF VARIOUS EMBODIMENTS

A processor-based system takes advantage of the nested structure of an extensible markup language (XML) document to cache partially completed computing operations. Thus, rather than caching a document either in its entirety or not at all, the processor-based system can cache portions of a document, namely, portions that correspond to sets of instructions that, when executed, perform the same operation or set of operations.

Certain advantages may be realized as a result. For instance, significant improvements in performance, e.g., speed of generating electronic documents, can be realized by storing results from an operation and retrieving those results rather than performing the operation anew. In addition, by caching results of operations or groups of operations rather than entire documents, a greater amount of data may be eligible for caching, thereby potentially improving performance on a broader level than some conventional caching techniques.

According to various embodiments, an electronic document is generated using a highly structured set of programming instructions. The instructions are stand-alone such that they cause the system to perform the same operation or operations, with the same results, whenever they are encountered. Because the instructions consistently result in the performance of the same operation or operations, the system can reliably cache them. That is, the system can cache the results obtained by executing the instructions with a high probability that, when the system encounters the instructions again, the system will not need to execute the instructions again, but can obtain the same results from the cache memory.

Accordingly, the system recognizes individual instructions or sets of instructions and caches the results obtained by executing them. When a recognized instruction or set of instructions is encountered during runtime, the system checks the cache to determine whether the instruction or set of instructions has already been executed, and the result of the execution stored in the cache memory, within a configurable time period. If the instruction or set of instructions has been executed within the time period, the system retrieves the result from the cache memory rather than executing the instruction or set of instructions again.

By caching the results of executing individual instructions or sets of instructions rather than entire documents, the system can improve the speed of generating even dynamically generated documents. The set of instructions for generating an electronic document contain various instructions for creating content, assembling and processing data, writing to data stores, and other tasks that are performed by web applications. Usage of such web applications by a large number of users may improve the speed of generating electronic documents even further. As more users behave similarly, i.e., provide similar inputs to such web applications, over time, certain components of the document that are dynamic with respect to individual users may become relatively static with respect to a multitude of users. That is, certain components of the document may tend toward a steady state that may be suitable for caching.

The following description of various embodiments implemented in the context of delivering web pages over the Internet is to be construed by way of illustration rather than limitation. This description is not intended to limit the invention or its applications or uses. For example, while various embodiments are described as being implemented in this context, it will be appreciated that the principles of the disclosure are applicable to electronic document generation in other contexts.

In the following description, numerous specific details are set forth in order to provide a thorough understanding of various embodiments. It will be apparent to one skilled in the art that some embodiments may be practiced without some or all of these specific details. In other instances, well known components and process steps have not been described in detail.

Various embodiments may be described in the general context of processor-executable instructions, such as program modules, being executed by a processor. Generally, program modules include routines, programs, objects, components, data structures, etc., that perform particular tasks or implement particular abstract data types. The invention may also be practiced in distributed processing environments in which tasks are performed by remote processing devices that are linked through a communications network or other data transmission medium. In a distributed processing environment, program modules and other data may be located in both local and remote storage media, including memory storage devices.

Figure 1:
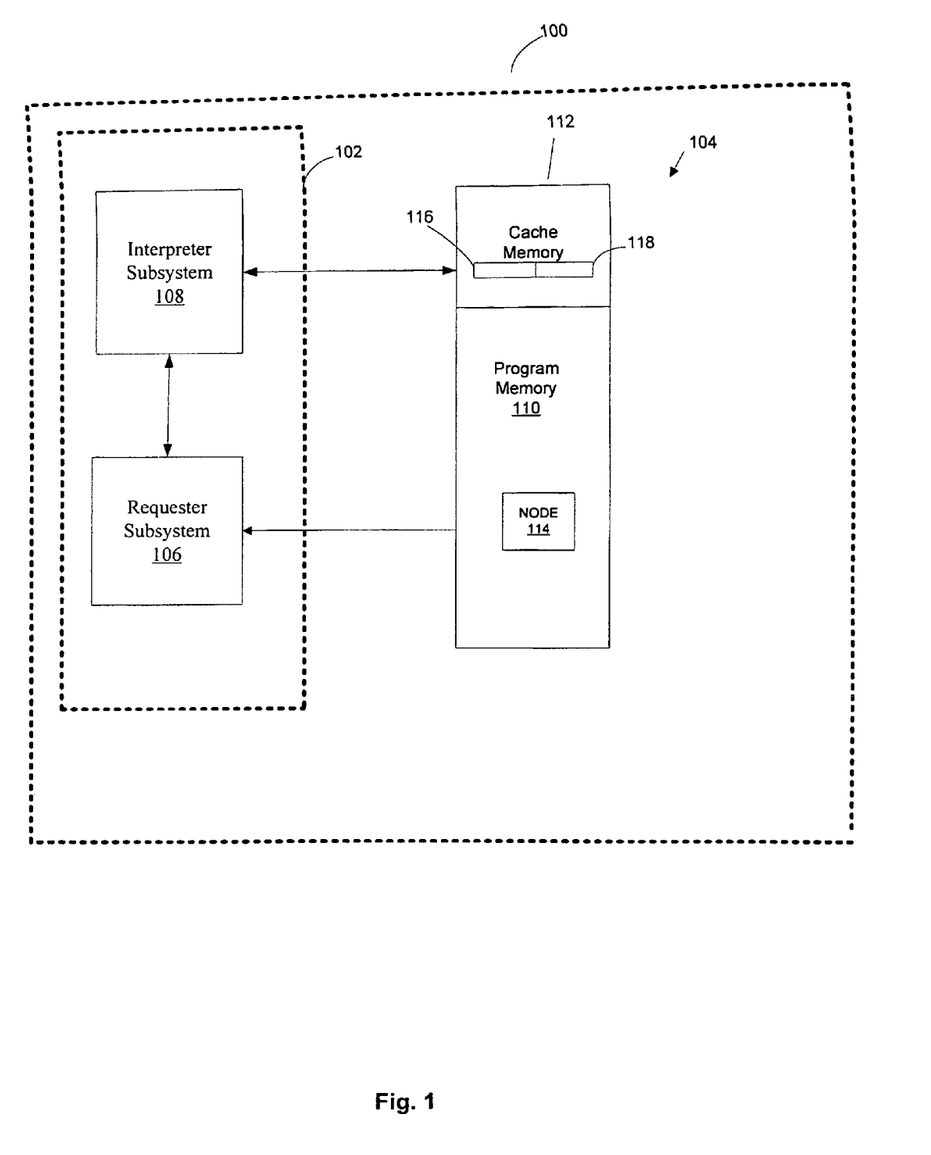
FIG. 1 is a block diagram illustrating a system for generating an electronic document according to one embodiment.

Referring now to the drawings, FIG. 1 is a block diagram illustrating a microprocessor-based system 100 according to one embodiment. The microprocessor-based system 100 includes at least one microprocessor 102 and at least one memory arrangement 104. On a conceptual level, the microprocessor 102 includes a requester subsystem 106 and an interpreter subsystem 108. As physically implemented, the requester subsystem 106 and the interpreter subsystem 108 may reside in the same microprocessor 102 or in different microprocessors. If both subsystems reside in a single microprocessor 102, the requester subsystem 106 and the interpreter subsystem 108 may or may not be implemented by distinct circuitry within the microprocessor 102.

The microprocessor 102 is typically configured to operate with one or more types of processor readable media. Processor readable media can be any available media that can be accessed by the microprocessor 102 and includes both volatile and nonvolatile media, removable and non-removable media. By way of example, and not limitation, processor readable media may include storage media and communication media. Storage media includes both volatile and nonvolatile, removable and nonremovable media implemented in any method or technology for storage of information such as processor-readable instructions, data structures, program modules, or other data. Storage media includes, but is not limited to, RAM, ROM, EEPROM, flash memory or other memory technology, CD-ROM, digital versatile discs (DVDs) or other optical disc storage, magnetic cassettes, magnetic tape, magnetic disk storage or other magnetic storage devices, or any other medium that can be used to store the desired information and that can be accessed by the microprocessor 102. Communication media typically embodies processor-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also intended to be included within the scope of processor-readable media.

The memory arrangement 104 includes a program memory 110 and a cache memory 112. The program memory 110 and the cache memory 112 may reside in a single memory module or in different memory modules. The program memory 110 is configured to store microprocessor-readable instructions. The cache memory 112 selectively stores data that is eligible for caching. The data may be stored, for example, as a number of data items 116 and associated cache key values 118. While the cache memory 112 is depicted in FIG. 1 as storing one data item 116 and one associated cache key value 118, it will be appreciated by those of ordinary skill in the art that the cache memory 112 typically stores many data items 116 and associated cache key values 118.

When the interpreter subsystem 108 encounters an instruction or set of instructions that is eligible for caching, the interpreter subsystem 108 determines whether the result that would be obtained by executing the instruction or set of instructions is stored in the cache memory 112. If the result is stored in the cache memory 112, the interpreter subsystem 108 retrieves the cached result rather than executing the instruction or set of instructions.

According to various embodiments, the system 100 generates an electronic document by executing a set of microprocessor-readable instructions. These instructions are stored in the program memory 110 and are organized in logical units known as instruction nodes 114, each of which may contain one or more instructions. While the program memory 110 is depicted in FIG. 1 as storing one instruction node 114, it will be appreciated by those of ordinary skill in the art that, in most cases, the program memory 110 will store many instruction nodes 114.

Figure 2:
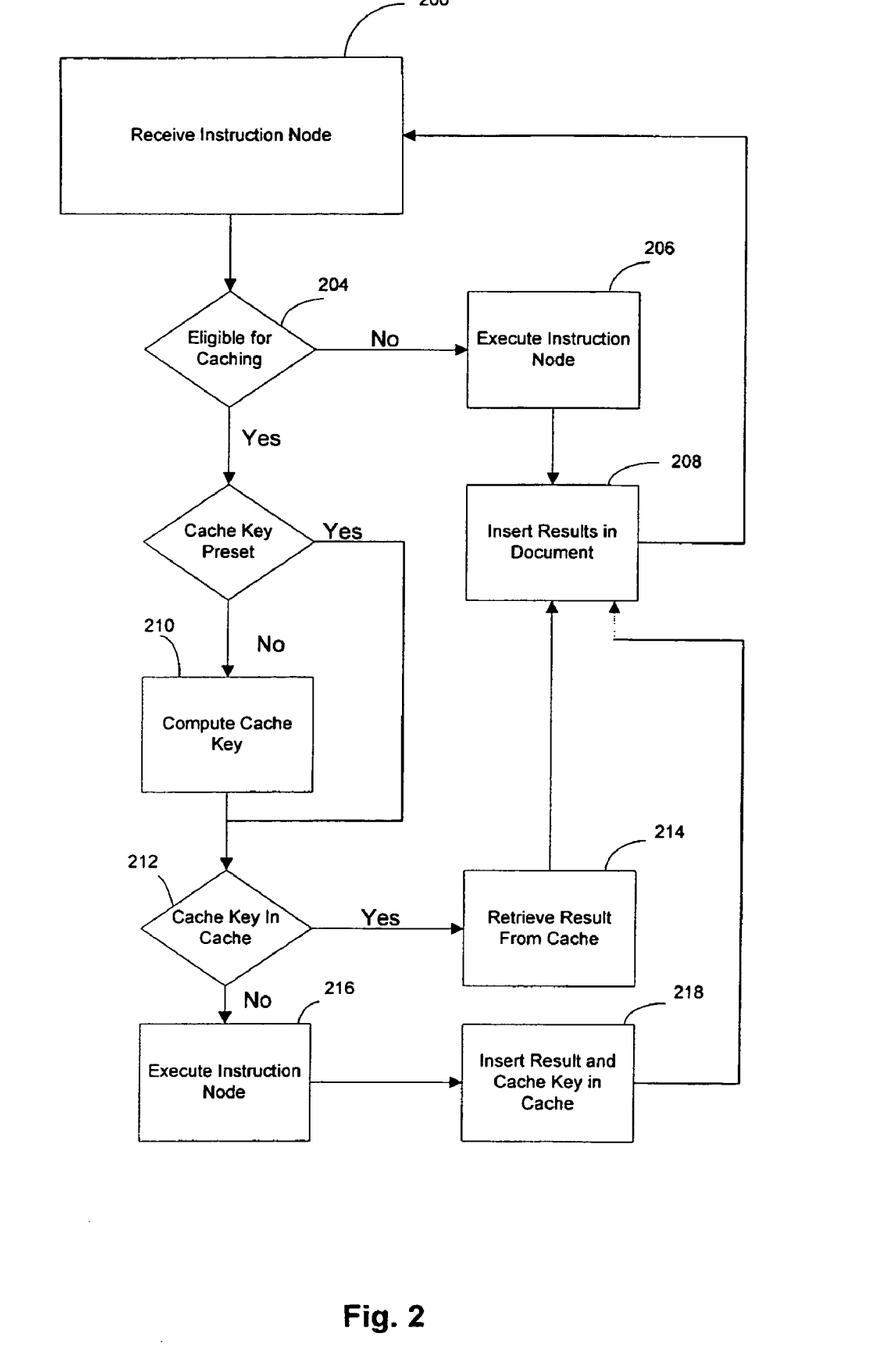
FIG. 2 is a flow diagram illustrating a method for generating an electronic document according to another embodiment.

FIG. 2 is a flow diagram illustrating an example method for generating the electronic document. The electronic document is generated based on a set of instruction nodes stored in the program memory 110. The requester subsystem 106 retrieves an instruction node from the program memory 110 (200). The instruction node includes at least one executable instruction and may also include nonexecutable XML code.

The interpreter subsystem 108 determines whether the instruction node is eligible for caching (204). Certain instruction nodes are not eligible for caching. For example, some instruction nodes may be designated as not eligible for caching using predetermined codes. If the instruction node is not eligible for caching, the interpreter subsystem 108 executes the instruction node (206) and inserts the results of the execution of the instruction node in the electronic document (208). The requester subsystem 106 then retrieves another instruction node from the program memory 110 (200).

If the instruction node is eligible for caching, for example, if the instruction node contains code that directs the system 100 to cache the result obtained by executing the instruction node, the instruction node will be associated with a cache key value. The cache key value can be computed during runtime or specified a priori by encoding the cache key value in the instruction node. If the cache key value is not specified a priori, the interpreter subsystem 108 computes the cache key value (210).

The interpreter subsystem 108 then determines whether the specified or computed cache key value has already been stored in the cache memory 112 as a result of prior execution of the instruction node (212). If the cache key value has already been stored in the cache memory 112, the interpreter subsystem 108 retrieves the data item associated with the stored cache key value from the cache memory 112 (214) and inserts the retrieved data item in the electronic document (208). The requester subsystem 106 then retrieves another instruction node from the program memory 110 (200).

In some cases, the specified or computed cache key value may not be stored in the cache memory 112. For example, the instruction node may not have been executed within the specified time period. Alternatively, the cache memory 112 may have been instructed to store more data than its capacity permits, and older data may have been purged from the cache memory 112 to make room for newer data. When the cache key value is not currently stored in the cache memory 112, the interpreter subsystem 108 executes the instruction node (216). The interpreter subsystem 108 inserts the result of executing the instruction node in the cache memory 112 along with the specified or computed cache key value (218). The interpreter subsystem 108 also inserts this result in the electronic document (208) either before or after inserting the result and cache key value in the cache memory 112. The requester subsystem 106 then retrieves another instruction node from the program memory 110 (200). This process continues until all of the executable instruction nodes have been handled either by execution or by retrieval of data from the cache memory 112. In this way, the interpreter subsystem 108 generates portions of the electronic document that are associated with instruction nodes that are associated with stored cache key values by retrieving data items from the cache memory 112 rather than by executing such nodes.

By way of example, a computer application containing the instruction nodes can be encoded as an XML document. The instructions that constitute the document follow the formatting rules of XML and are recognizable as being part of an instruction language. In addition to the instructions themselves, the XML document can also contain generic XML code that is not part of the instructions. The XML code that is not part of the instructions is recognizable as not being part of the instruction language.

An XML document includes text that is formatted with tags known as markup. For example, one portion of an XML document might appear as:

TEXT<tag>content</tag>TEXT

XML conventions require that any tag must be matched with a closing tag. In the above example, the <tag> tag is matched with the </tag> closing tag. This pair of tags, in addition to the content between the tags, is known as a node. Thus, in the above example, the node consists of:

```
<tag>content</tag>
```

One feature of XML is that nodes can be nested in a hierarchical structure. In this structure, each node may contain any number of child nodes, but can itself be the child node of only one parent node. One example of nesting is as follows:

```
<parentnode>
    some text
    <node1>
        <childnode>even more text</childnode>
    </node1>
    <node2>text</node2>
</parentnode>
```

The above example includes four nodes: parentnode, node1, node2, and childnode. Node1 and node2 are nested within parentnode, and childnode is nested within node1 and therefore also within parentnode. The group of a parent node and its child nodes is known as a branch. Thus, in this example, parentnode is a branch.

Figure 3:
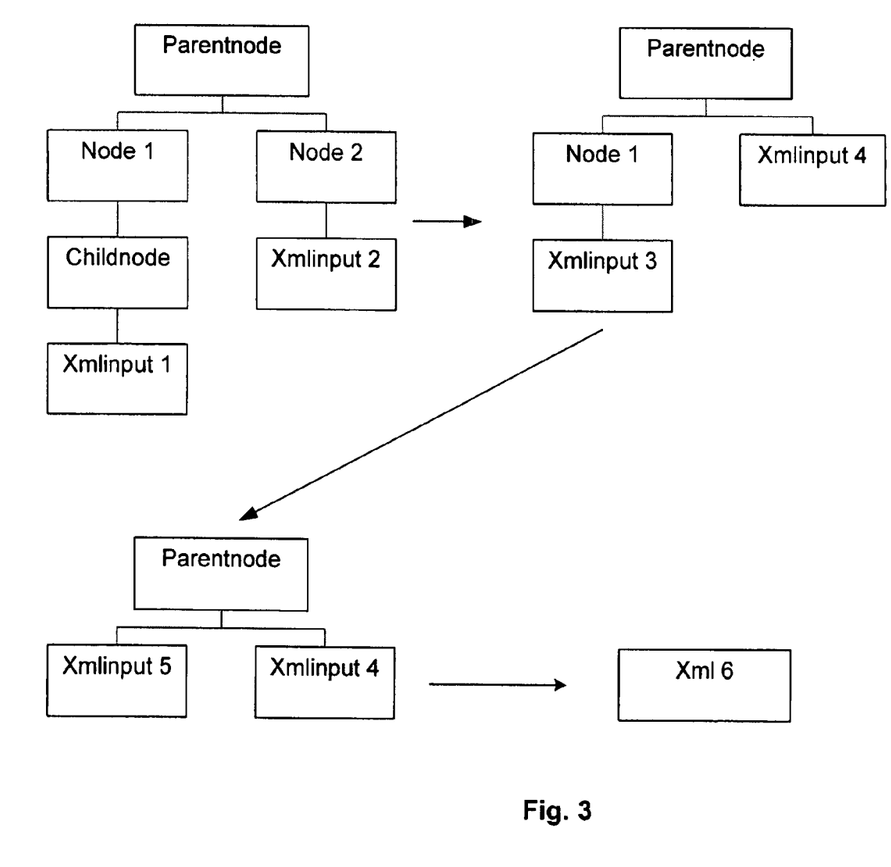
FIG. 3 is a diagram illustrating an example order of execution of instruction nodes to generate an electronic document.

In the above example, assuming that all four nodes are executable, the most deeply nested node is executed first, and the result obtained by executing the node is the input of the next node in the hierarchy. If two or more instruction nodes are at equal levels in the hierarchy and have the same parent node, they are executed in the order of their appearance in the XML document. For example, in the above example, node1 and node2 are of equal level in the hierarchy, but node1 appears first in the XML document and is executed before node2. FIG. 3 is a diagram illustrating an example order of execution of the nodes in the above example. Childnode is executed first because it is the most deeply nested node. The result of executing childnode with the input xmlinput1 becomes xmlinput3 to node1. In addition, the result of executing node2 with the input xmlinput2 becomes xmlinput4 to parentnode. Next, node1 is executed with xmlinput3 to produce the result xmlinput5. Finally, parentnode is executed with inputs xmlinput5 and xmlinput4 to produce xml6, a portion of the electronic document.

Each instruction node is a single XML node written in the instruction language. The whole branch of the XML document rooted in the instruction node contains all of the information that the interpreter subsystem 108 needs to perform any required operations. The branch may contain any amount of XML encoded instructions to guide the interpreter subsystem 108 in performing the operations. In addition, the branch may contain other XML code that does not itself form part of the instructions, but rather provides input that the interpreter subsystem 108 may need when executing the instructions in the instruction node. For example, data to be written to a database may be XML encoded into the branch.

In this way, the interpreter subsystem 108 is configured to follow the instructions contained in each instruction node to the extent that the instruction language allows. For example, the instruction language may provide instructions for retrieving information from a database. The interpreter subsystem 108 is configured with knowledge of how to contact the database based on parameters contained in the instruction node, including the instructions contained in its entire branch. The interpreter subsystem 108 is also configured with knowledge as to which SQL statement to execute on the database, e.g., a SQL statement contained in the instruction node. The interpreter subsystem 108 is also configured to format the information retrieved from the database into XML if this returned data is not already formatted in XML. The interpreter subsystem 108 is also configured to transform the returned data based on instructions in the instruction node.

After the instructions contained in an instruction node are executed, the XML-formatted output of the instruction node is inserted into the XML document, replacing the instruction node that was executed and its branch. The replacement of the instruction node by the result or output obtained by executing the instruction node also removes all XML code located below the instruction node in the hierarchy. In this way, the output obtained by executing the instruction node becomes the input, or part of the input, for an instruction node of higher order in the hierarchy. By nesting instruction nodes within other instruction nodes, simple instructions can be combined to perform operations of varying degrees of complexity.

According to various embodiments, the nested structure of an XML document can be exploited to cache partially completed computing operations. After an instruction node that is eligible for caching has been executed, the interpreter subsystem 108 inserts the output of the instruction node as a data item into the cache memory 112. The data item is associated with a cache key value that may be computed as a function of the XML code that the instruction node contained at the time it was executed, including its branch below it in the hierarchy. Alternatively, to conserve computing resources, the cache key value may be encoded into the instruction node itself rather than computed during runtime. The cache key value may also be encoded into the instruction node to override default behavior, for example, to cause instruction nodes that are different to return the same output. As mentioned above, an instruction node contains all the information that is required for the interpreter subsystem 108 to execute the instructions in the instruction node. Accordingly, just as repeating a single instruction produces the same results, repeating multiple instructions in the same order also produces the same output.

Another example of an XML document containing instruction nodes appears below.

```
<NODE1>
    <NODE2> </NODE2>
    <NODE3>some data</NODE3>
    <NODE2>some more data</NODE2>
    <NODE2>
        <NODE4>
            <NODE3>some data</NODE3>
        </NODE4>
    </NODE2>
</NODE1>
```

The instruction nodes with the tag NODE2 are siblings of each other and are child nodes of the instruction node with the tag NODE1. They are also different from one another. The two instruction nodes with the tag NODE3 are identical, even though they appear in different parts of the XML tree. When comparing two instruction nodes to determine whether they are identical, only the instruction nodes themselves and their respective branches below them are relevant. If the instruction nodes are identical and have identical branches below them, their cache key values will be identical.

If the data contained in the instruction nodes are instructions to a computer application, then all occurrences of the instruction node with the tag NODE3 would be the same instruction. Repeating the same instruction with the same input or inputs, regardless of the complexity of the instruction, produces the same results. Accordingly, the result obtained by executing the instructions in the instruction node with the tag NODE3 can be cached. When the interpreter subsystem 108 encounters another occurrence of the instruction node with the tag NODE3, the interpreter subsystem 108 can retrieve the cached result rather than executing the instruction node anew. In particular, when the interpreter subsystem 108 receives an instruction, it computes the cache key value for the received instruction and accesses the cache memory 112 to determine whether the cache memory 112 currently stores a cache key value that matches the computed cache key value. In this way, the interpreter subsystem 108 determines whether, for example, the instruction node with the tag NODE3 has already been executed. If a matching cache key value is found and the cached information corresponding to the matching cache key value has not expired, the interpreter subsystem 108 does not execute the instruction node again, but instead retrieves the cached information from the cache memory 112. If, on the other hand, the interpreter subsystem 108 does not find a matching cache key value, the instruction node is executed and the result is inserted into the cache memory 112 as well as into the XML document. The instruction node is also executed if there is a matching cache key value in the cache memory 112, but the corresponding cached information has expired.

According to some embodiments, the instruction language may provide instructions that specify the amount of time that the result of executing a particular instruction node is to be maintained in the cache memory 112. After this duration, the cached information expires and is no longer retrieved instead of executing the instruction node to which it corresponds. The amount of time that information is cached may be selected based on the frequency with which the information is expected to be changed. For example, information that is expected to change only rarely can be cached for a considerable duration. Caching rarely updated information for long durations may avoid the need to perform some time-consuming and computationally expensive database lookup and rendering operations. As another example, in some cases, it may be desirable that an instruction should be executed anew after a certain time period, even if it receives the same input values that it received in a previous iteration. In such cases, the application developer can specify that the instruction node is only eligible for caching for that time period.

Certain types of instructions are not appropriate for caching. For instance, write operations are not typically cached. In addition, in some cases, it may be undesirable for an instruction to provide the same result for the same inputs whenever the instruction is executed. In such situations, the instruction language may provide additional instructions that specify that a particular instruction should never be cached, but rather executed every time that it is invoked. When the interpreter subsystem 108 encounters an instruction node that contains an instruction designating the instruction node as ineligible for caching, no cache key value is computed. Further, the interpreter subsystem 108 does not consult the cache memory 112 or insert the results of executing such instruction nodes into the cache memory 112.

An example portion of an XML document in which instruction nodes are executed in order of their depth of nesting in the XML hierarchy appears immediately below. This example assumes single-threaded execution of instruction nodes. Comment fields appearing next to the node tags are demarcated with "<!--" and "-->" character strings. These comment fields show the order of execution of the instruction nodes and indicate whether the instructions are executed by the interpreter subsystem 108. Instruction nodes that are not executed are denoted by "N E" appearing in the corresponding comment field. For such instruction nodes, the interpreter subsystem 108 retrieves a cached result from the cache memory 112.

```
<NODE5>                                          <!-- 22nd -->
    <NODE6>                                      <!-- 20th NE -->
        <NODE7>                                  <!-- 16th NE -->
            <NODE10>instruction b</NODE10>       <!-- 7th NE -->
            <NODE11>instruction c</NODE11>       <!-- 8th NE -->
        </NODE7>
        <NODE8>                                  <!-- 17th NE -->
            <NODE10>instruction b</NODE10>       <!-- 9th NE -->
            <NODE11>instruction c</NODE11>       <!-- 10th NE -->
        </NODE8>
        <NODE9>                                  <!-- 18th NE -->
            <NODE11>instruction c</NODE11>       <!-- 11th NE -->
            <NODE10>instruction b</NODE10>       <-- 12th NE -->
        </NODE9>
    </NODE6>
    <NODE12>                                     <!-- 21st -->
        <NODE6>                                  <!-- 19th -->
            <NODE7>                              <!-- 13th This node no longer
(at execution time) contains the instruction nodes NODE10 or NODE11 themselves, but
the XML which was the output of their execution. -->
                <NODE10>instruction b</NODE10>   <!-- execution order: 1st
This is the most deeply nested node and first in document order of the nodes that are at
the same depth. -->
                <NODE11>instruction c</NODE11>   <!-- 2nd -->
            </NODE7>
            <NODE8>                              <!--14th NE This node
contains the outputs of NODE10 and NODE11. A node with this exact same input and
content has been executed (13th) and the results of that operation can be collected from
the cache. -->
                <NODE10>instruction b</NODE10>   <!-- 3rd NE -->
                <NODE11>instruction c</NODE11>   <!-- 4th NE -->
            </NODE8>
```

```
        <NODE9>                                  <!-- 15th This node contains
the outputs of NODE10 and NODE11, but in an order not previously encountered. The
node instructions are carried out. -->
            <NODE11>instruction c</NODE11>       <!-- 5th NE -->
            <NODE10>instruction b</NODE10>       <!-- 6th NE -->
        </NODE9>
      </NODE6>
    </NODE12>
</NODE5>
```

As noted in the comment fields, the instruction nodes with the tags NODE10 and NODE11 are not executed after their first occurrences. When the interpreter subsystem 108 first encounters these instruction nodes the interpreter subsystem 108 executes them and inserts the result both in the XML document and in the cache memory 112. Upon subsequently encountering these instruction nodes, the interpreter subsystem 108 retrieves the cached result from the cache memory 112 and inserts the cached result in the XML document.

Instruction nodes are not identical when the instructions contained in them do not appear in the same order. In the example above, the instruction nodes with the tags NODE8 and NODE9 both contain the output of the execution of the instruction nodes with the tags NODE10 and NODE11, but in a different order. Thus, the instruction nodes with the tags NODE8 and NODE9 are not identical, and the results of executing one of the instruction nodes cannot be cached for use with the other instruction node. The instruction nodes with the tags NODE7 and NODE8, however, are identical, and the result obtained by executing the instruction node with the tag NODE7 can be used instead of executing the instruction node with the tag NODE8.

The instruction nodes with the tag NODE6 contain multiple instruction nodes. However, when the time comes to execute these nodes, the instruction nodes nested within them will have already been executed and their results inserted into the XML document in their place. Thus, when the instruction nodes with the tag NODE6 are executed, they will no longer contain nested instruction nodes.

Breaking complex operations up in this way allows the interpreter subsystem 108 to check at each step whether an instruction node has been executed before and whether the result obtained by executing the instruction node is in the cache memory 112. If the result is in the cache memory 112, then the instruction node need not be executed, and the results can be smoothly incorporated into the larger context of the XML document. An application developer can break the operations down into some components that can be expected to produce mostly static outcomes and other components that can be expected to produce mostly dynamic outcomes. The duration for which the outcomes of these components are cached can be set on a per component basis, such that those components that are expected to produce mostly dynamic outcomes are cached for relatively short durations, if at all.

Various embodiments described herein may produce certain advantages, particularly in the context of privacy and security. The indivisible, self-contained nature of each instruction node allows the cache memory 112 to be shared among any number of users of the application without regard to privacy. The lookup of the personal information of a user in a central database can be safely cached because the same instruction looking up corresponding information for another user will not be identical. This differentiation results from the incorporation within the instruction node of information that identifies the user in its XML code, such as the output of a previously executed instruction node that collected the user login information from a HTTP cookie. Since the previously executed instruction node is not exactly identical to a similar instruction node executed for a different user, the cache key will not be identical either, and the results obtained by executing an instruction node for one user will not be used for another user, even with similar instructions in the instruction node.

An example portion of an XML document in which instruction nodes are replaced with the results of their execution appears in FIG. 4. The XML code of FIG. 4 may be used, for example, for generating a personalized web page for a particular user. Executable instruction nodes are designated with a "pbf" namespace. The most deeply nested instruction node is executed first. In the example XML code of FIG. 4, this node is identified in boldface type. This instruction node, when executed, causes the system 100 to extract the name of the user from a cookie. After the instruction node is executed, it is replaced in the XML document with the result obtained by its execution.

FIG. 5 shows the XML code of FIG. 4 after the executed instruction node is replaced with the result obtained by its execution, namely, "joe_user." The next most deeply nested instruction node is executed next. This instruction node is indicated in boldface type in FIG. 5. Because this instruction node now contains the name of a user, "joe_user," it is highly unlikely that the instruction node will be identical to a corresponding instruction node executed to extract the name of a different user. As a result, the cache key value corresponding to this instruction node will not match the cache key value that would be generated for a different user, and therefore cached information will not be shared between different users. When the indicated instruction node is executed, the system 100 performs an LDAP search with the information given in the Directory Server Markup Language (DSML) statement. In this case, the system 100 looks up some attribute of the user that determines, for example, what type and quantity of information will be presented to the user. After the instruction node is executed, it is replaced in the XML document with the result obtained by its execution, e.g., "internal_admin_user."

Figure 6:
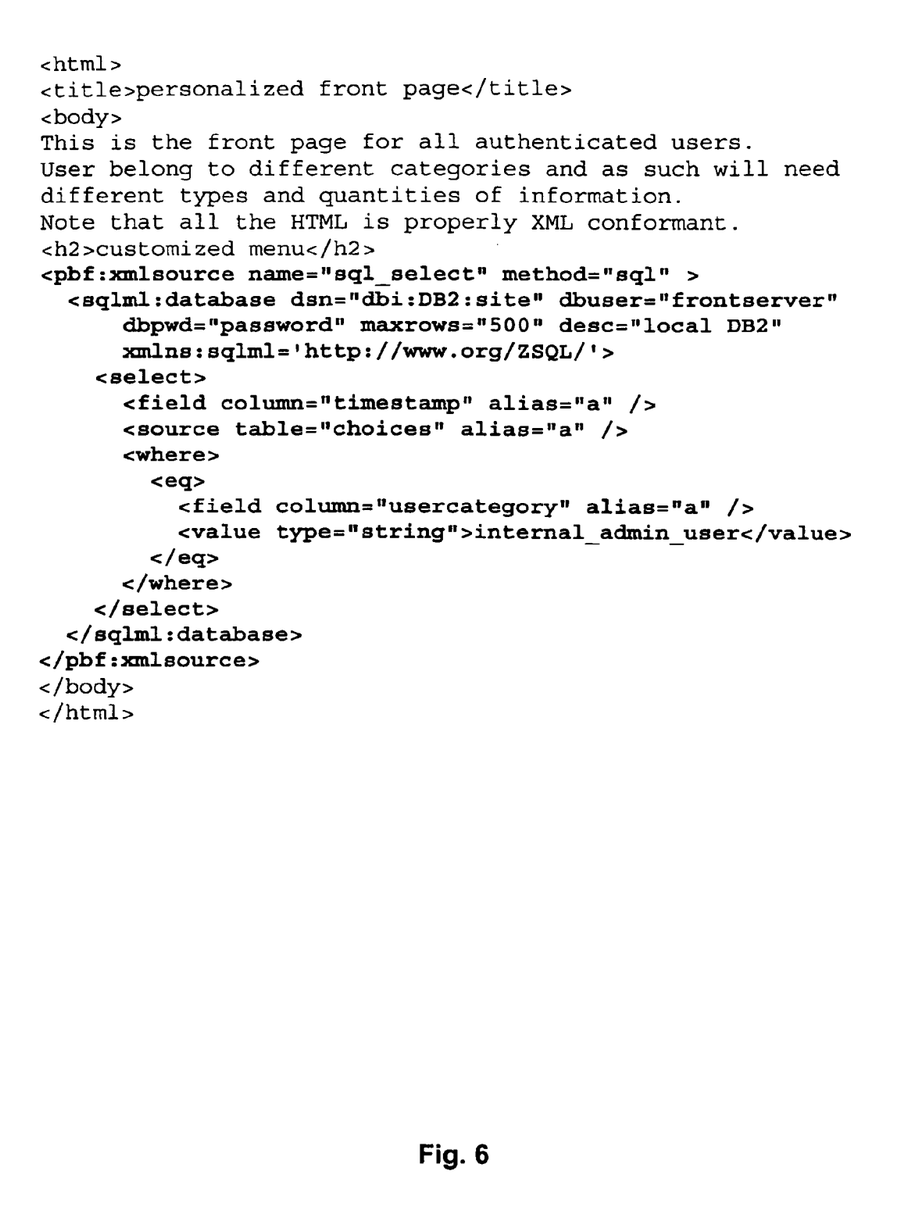
FIG. 6 illustrates the portion of the XML document of FIG. 5 after an instruction node has been replaced with the result obtained by its execution.

FIG. 6 shows the XML code of FIG. 5 after the executed instruction node is replaced with "internal_admin_user." The next most deeply nested instruction node is executed next. This instruction node is indicated in boldface type in FIG. 6. This instruction node now contains a category name, "internal_admin_user," which, unlike the user name, is likely to be shared by a number of users. This instruction node will not likely be identical to corresponding instruction nodes executed for every user, but is likely to be identical to corresponding instruction nodes executed for some other users, namely, those of the category "internal_admin_user." As a result, the cache key value corresponding to this instruction node will match the cache key value that would be generated for other users of this category, but not for other users of different categories. Accordingly, the result of this operation only needs to be performed once for each category of user, rather than on a per user basis. Thus, computing resources may be conserved, particularly if the application is executed for a large number of users.

Figure 7:
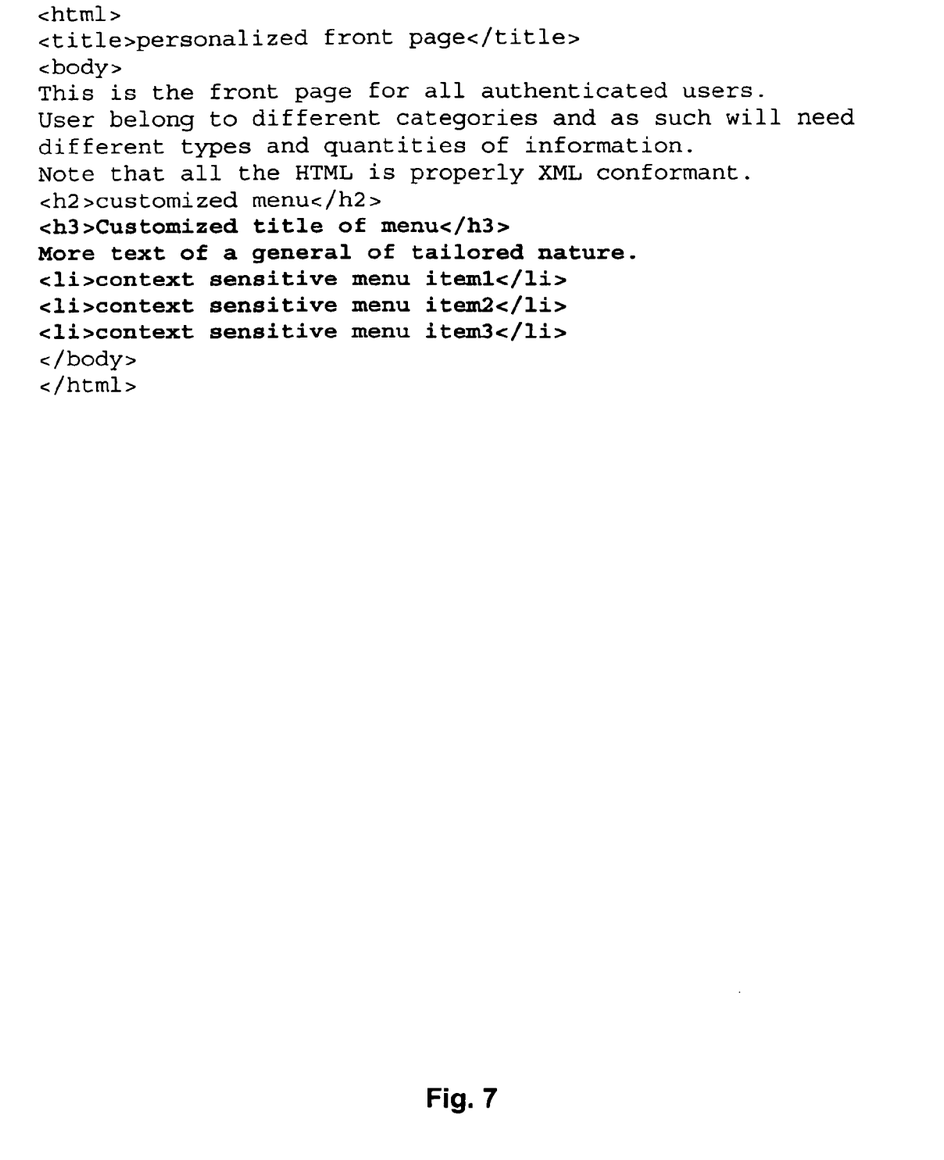
FIG. 7 illustrates the portion of the XML document of FIG. 6 after an instruction node has been replaced with the result obtained by its execution.

After the instruction node is executed, it is replaced in the XML document with the result obtained by its execution, e.g., formatted data returned from a database, as shown in FIG. 7. The text appearing in boldface type in FIG. 7 is the formatted data returned from the database. When all instruction nodes have been executed the interpreter returns the finished XML document to the requester. The finished XML document can be any kind of XML of any size or complexity. For example, the finished XML document may consist solely of a status code enclosed in a pair of tags. The XML code of FIG. 7 now contains only non-executable XML, including XML that has replaced the executable instruction nodes as well as non-executable XML that was present in the original source document. With the XML code no longer containing executable instructions, the data is now returned to the requester.

By way of another example, appearing immediately below is a portion of an XML document in which instruction nodes are executed in order of their depth of nesting in the XML hierarchy.

```
<NODE1>                                         <!-- 14 -->
    <NODE2>                                     <!-- 12 -->
        <NODE3>                                 <!-- 9 -->
            <NODE4>instruction b</NODE4>        <!-- 1 -->
            <NODE5>instruction c</NODE5>        <!-- 2 -->
        </NODE3>
        <NODE6>                                 <!-- 10 -->
            <NODE7>instruction b</NODE7>        <!-- 1 -->
            <NODE8>instruction c</NODE8>        <!-- 2 -->
        </NODE6>
        <NODE9>                                 <!-- 11 -->
            <NODE10>instruction c</NODE10>      <!-- 6 -->
            <NODE11>instruction b</NODE11>      <!-- 7 -->
            <NODE12>                            <!-- 8 -->
                <NODE13>instruction c</NODE13>  <!-- 3 -->
                <NODE14>                        <!-- 4 -->
                    <NODE15>                    <!-- 2 -->
                        <NODE16>instruction c</NODE16>  <!-- 1 -->
                    </NODE15>
                </NODE14>
                <NODE17>instruction c</NODE17>  <!-- 5 -->
            </NODE12>
        </NODE9>
    </NODE2>
    <NODE18>                                    <!-- 13 -->
        <NODE19>                                <!-- 11 -->
            <NODE20>                            <!-- 8 -->
                <NODE21>instruction b</NODE21>  <!-- 5 -->
                <NODE22>                        <!-- 6 -->
                    <NODE23>instruction b</NODE23>  <!-- 2 -->
                    <NODE24>instruction c</NODE24>  <!-- 3 -->
                    <NODE25>                    <!-- 4 -->
                        <NODE26>instruction c</NODE26>  <!-- 1 -->
                    </NODE25>
                </NODE22>
                <NODE27>instruction c</NODE27>  <!-- 7 -->
            </NODE20>
            <NODE28>                            <!-- 9 -->
                <NODE29>instruction b</NODE29>  <!-- 1 -->
                <NODE30>instruction c</NODE30>  <!-- 2 -->
            </NODE28>
            <NODE31>                            <!-- 10 -->
                <NODE32>instruction c</NODE32>  <!-- 1 -->
                <NODE33>instruction b</NODE33>  <!-- 2 -->
            </NODE31>
        </NODE19>
    </NODE18>
</NODE1>
```

Figure 8:
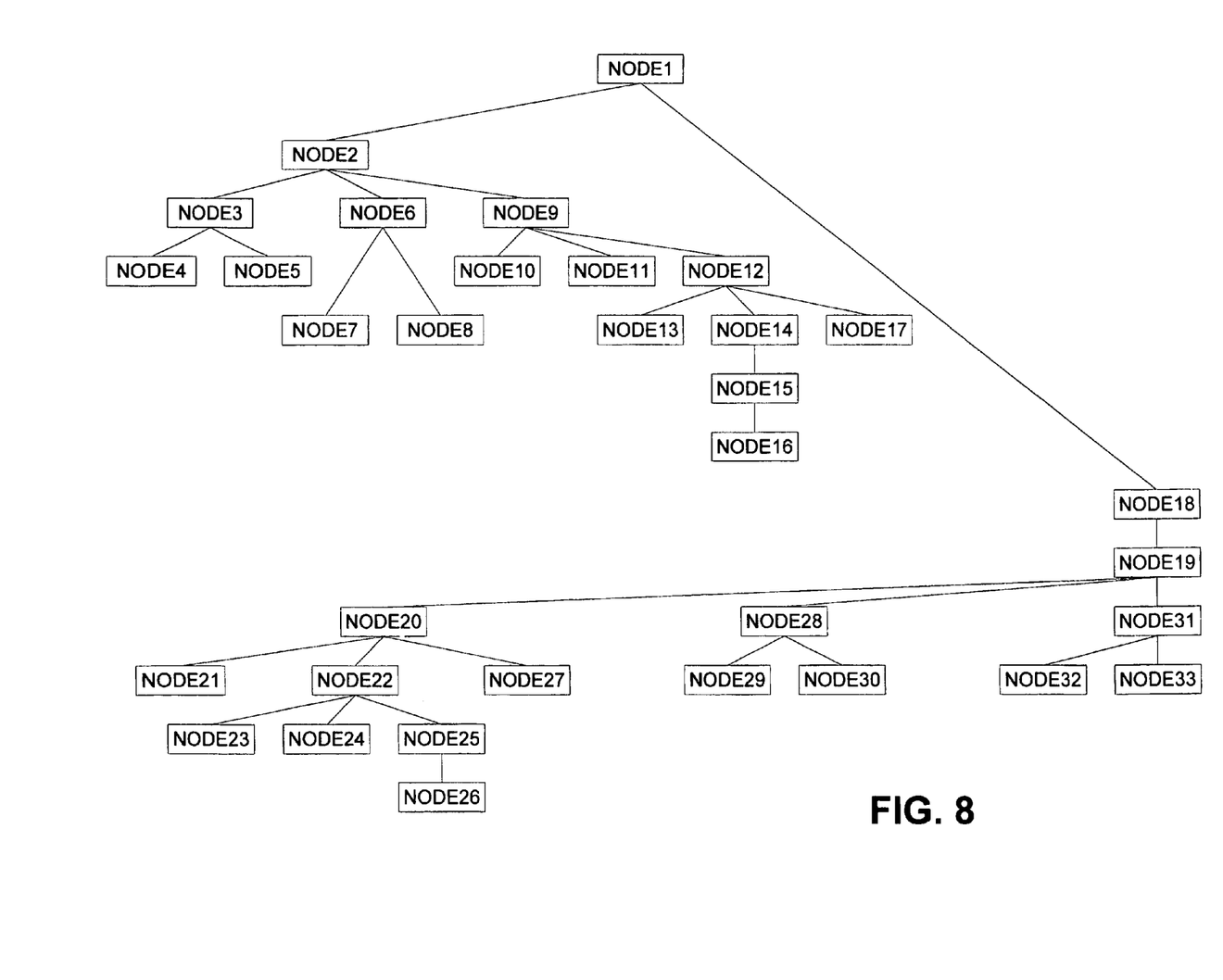
FIG. 8 is a block diagram illustrating hierarchical organization of an example portion of another XML document.

This portion of XML code is illustrated diagrammatically in FIG. 8. As shown in FIG. 8, NODE1 has two child nodes, NODE2 and NODE18. These child nodes are sibling nodes with respect to each other. In contrast to the previous example, this example assumes multi-threaded execution of instruction nodes. Multi-threaded execution can take place either with or without strict sibling node document order execution. If strict sibling node document order is observed, then all subsidiary nodes are executed prior to any sibling nodes, and sibling nodes are executed in the order in which they appear in the XML document. Thus, in the example above, the instruction nodes are executed or processed by accessing the cache memory 112 in the order noted in the comment fields. NODE4, NODE7, NODE16, NODE26, NODE29, and NODE32 are all at the deepest level of nesting and are executed first. NODE5 and NODE8 are at the same nesting level as NODE4 and NODE7, respectively, but occur later in the XML document and are therefore executed after NODE5 and NODE8 and at the same time as NODE15. After NODE15 is executed, NODE13 is executed because NODE13 occurs before NODE14 in the XML document.

Alternatively, the same XML code can be executed without strict sibling node document order execution. If strict sibling node document order is not observed, then instruction nodes are executed as soon as all of their subsidiary nodes have been executed. Appearing immediately below is the same sequence of instruction nodes, with the comment fields denoting the order of execution of the instruction nodes if strict sibling node document order is not observed.

```
<NODE1>                                         <!-- 7 -->
    <NODE2>                                     <!-- 6 -->
        <NODE3>                                 <!-- 2 -->
            <NODE4>instruction b</NODE4>        <!-- 1 -->
            <NODE5>instruction c</NODE5>        <!-- 1 -->
        </NODE3>
        <NODE6>                                 <!-- 2 -->
            <NODE7>instruction b</NODE7>        <!-- 1 -->
            <NODE8>instruction c</NODE8>        <!-- 1 -->
        </NODE6>
        <NODE9>                                 <!-- 5 -->
            <NODE11>instruction c</NODE11>      <!-- 1 -->
            <NODE10>instruction b</NODE10>      <!-- 1 -->
            <NODE12>                            <!-- 4 -->
                <NODE13>instruction c</NODE13>  <!-- 1 -->
                <NODE14>                        <!-- 3 -->
                    <NODE15>                    <!-- 2 -->
                        <NODE16>instruction c</NODE16>  <!-- 1 -->
                    </NODE15>
                </NODE14>
                <NODE17>instruction c</NODE17>  <!-- 1 -->
            </NODE12>
        </NODE9>
    </NODE6>
    <NODE18>                                    <!-- 6 -->
        <NODE19>                                <!-- 5 -->
            <NODE20>                            <!-- 4 -->
                <NODE21>instruction b</NODE21>  <!-- 1 -->
                <NODE22>                        <!-- 3 -->
                    <NODE23>instruction b</NODE23>  <!-- 1 -->
                    <NODE24>instruction c</NODE24>  <!-- 1 -->
                    <NODE25>                    <!-- 2 -->
                        <NODE26>instruction c</NODE26>  <!-- 1 -->
```

```
            </NODE25>
          </NODE22>
          <NODE27>instruction c</NODE28>          <!-- 1 -->
        </NODE20>
        <NODE28>                                   <!-- 2 -->
          <NODE29>instruction b</NODE29>          <!-- 1 -->
          <NODE30>instruction c</NODE31>          <!-- 1 -->
        </NODE28>
        <NODE31>                                   <!-- 2 -->
          <NODE32>instruction c</NODE32>          <!-- 1 -->
          <NODE33>instruction b</NODE33>          <!-- 1 -->
        </NODE31>
      </NODE19>
    </NODE18>
  </NODE1>
```

As noted in the comment fields above, NODE4, NODE5, NODE7, NODE8, NODE10, NODE11, NODE16, NODE21, NODE23, NODE24, NODE26, NODE27, NODE29, NODE30, NODE32, and NODE33 are all at the same nesting depth and are all executed at the same time. Unlike the previous example, the system 100 does not wait to execute NODE5 until NODE4 is executed, for example.

With strict sibling node document order execution observed, the above XML code requires 14 steps to execute fully. By contrast, when strict sibling node document order execution is not observed, only 7 steps are involved. As shown by the examples above, execution speed can be significantly faster when strict sibling node document order execution is not observed. However, this mode of execution does not guarantee execution order among sibling nodes. Only child-before-parent execution order is guaranteed. Both modes represent an improvement over single threaded execution, which would require 33 steps.

In some embodiments, the interpreter subsystem 108 may be configured to accept newly created instruction nodes during runtime. New instruction nodes may be created, for example, as the output of existing instruction nodes. For security reasons, the interpreter subsystem 108 may be configured such that instruction nodes created during runtime are not executed unless the interpreter subsystem 108 has explicit instructions to process newly created instruction nodes. If the interpreter subsystem 108 does not have such instructions, the newly created instruction node is treated as any other generic XML and is not executed. When all executable instruction nodes are known in advance and changes to these instruction nodes are not allowed, runtime security is preserved.

Because all instruction nodes must conform both to XML formatting conventions as well as to the syntax of the instruction language, sophisticated validation routines can be implemented to ensure that no unauthorized operations are executed during runtime. These validation routines may use, for example, XPath or XSLT. Because the validation procedures themselves can be written in XML, for example with XSLT, they can be embedded in the instructions as additional instruction nodes and can be used to validate instruction nodes created during runtime when the execution of such nodes is allowed. The XML formatting of the instruction language precludes writing instructions in such a way that a validation procedure cannot both find and recognize them.

Because the programming language is fully XML compliant, all commands are fully addressable. It is difficult or impossible to surreptitiously bury instructions in the code. With the frequent outsourcing of the actual work of programming an application, the ability to screen the code may significantly improve security relative to conventional approaches. All instructions can be fully addressed and searched, rendering it difficult or impossible to hide potentially objectionable instructions from later inspection, either before or during runtime.

It will be understood by those who practice the embodiments described herein and those skilled in the art that various modifications and improvements may be made without departing from the spirit and scope of the disclosed embodiments. The scope of protection afforded is to be determined solely by the claims and by the breadth of interpretation allowed by law.

What is claimed is:

1. A microprocessor-based system for generating an electronic document in a second form, the microprocessor-based system comprising:
  a program memory configured to store an instruction node comprising at least one microprocessor-readable instruction for generating the electronic document in a first form;
  a cache memory configured to store a cache key value and a data item associated with the stored cache key value;
  a requester subsystem configured to receive a set of at least two instruction nodes from the program memory, at least one instruction node comprising at least one child node such that each child node has a depth of nesting; and
  an interpreter subsystem configured to, for each depth of nesting,
    if an instruction node is eligible for caching, compare a cache key value associated with the eligible instruction node with a cache key value stored in a cache memory and associated with a data item, and
    if the cache key value associated with the eligible instruction node matches the cache key value stored in the cache memory, retrieve the data item with the cache key value stored in the cache memory, and insert the received data item into the first form of the electronic document to replace the instruction node;
    repeat processing of instruction nodes at a different depth of nesting until the second form of the electronic document is generated; and
    replace the first form with the second form to enable generation of the electronic document faster from the second form than from the first form.

2. The microprocessor-based system of claim 1, wherein the interpreter subsystem is further configured to calculate the cache key value associated with the instruction node.

3. The microprocessor-based system of claim 1, wherein the cache key value associated with the instruction node is encoded in the instruction node.

4. The microprocessor-based system of claim 1, wherein the interpreter subsystem is further configured to, when the cache key value associated with the instruction node does not match the stored cache key value:
  execute the at least one microprocessor-readable instruction of the instruction node to obtain a result;
  generate at least a portion of the electronic document as a function of the result; and
  store the result as a data item in the cache memory.

5. The microprocessor-based system of claim 1, wherein the interpreter subsystem is further configured to identify the instruction node as not eligible for caching if the instruction node contains a microprocessor-readable instruction designating the instruction node as not eligible for caching.

6. The microprocessor-based system of claim 5, wherein the interpreter subsystem is further configured to, in response to identifying the instruction node as not eligible for caching:

execute the at least one microprocessor-readable instruction of the instruction node to obtain a result; and
generate at least a portion of the electronic document as a function of the result without storing the result as a data item in the cache memory.

7. The microprocessor-based system of claim 1, wherein the microprocessor-based system is configured to execute a plurality of instruction nodes using a multi-threaded execution technique.

8. A method for generating an electronic document in a second form as a function of a set of microprocessor-readable instructions for generating the electronic document in a first form, the method comprising:
  (a) receiving a set of at least two instruction nodes, each instruction node comprising at least one microprocessor-readable instruction from the set of microprocessor-readable instructions, at least one instruction node comprising at least one child node such that each child node has a depth of nesting;
  (b) for each depth of nesting,
    (1) if an instruction node is eligible for caching, comparing a cache key value associated with the eligible instruction node with a cache key value stored in a cache memory and associated with a data item;
    (2) if the cache key value associated with the eligible instruction node matches the cache key value stored in the cache memory, retrieving the data item with the cache key value stored in the cache memory; and
    (3) inserting the received data item into the first form of the electronic document to replace the eligible instruction node;
  (c) repeating (b) at a different depth of nesting until the second form of the electronic document is generated, the first form being replaceable by the second form to enable generation of the electronic document faster from the second form than from the first form.

9. The method of claim 8, farther comprising calculating the cache key value associated with the instruction node.

10. The method of claim 8, wherein the cache key value associated with the instruction node is encoded in the instruction node.

11. The method of claim 8, further comprising, when the cache key value associated with the instruction node does not match the stored cache key value:
  executing the at least one microprocessor-readable instruction of the instruction node to obtain a result;
  generating at least a portion of the electronic document as a function of the result; and
  storing the result as a data item in the cache memory.

12. The method of claim 8, further comprising identifying the instruction node as not eligible for caching if the instruction node contains a microprocessor-readable instruction designating the instruction node as not eligible for caching.

13. The method of claim 12, further comprising, in response to identifying the instruction node as not eligible for caching:
  executing the at least one microprocessor-readable instruction of the instruction node to obtain a result; and
  generating at least a portion of the electronic document as a function of the result without storing the result as a data item in the cache memory.

14. The method of claim 8, further comprising:
  receiving a plurality of instruction nodes each comprising at least one microprocessor-readable instruction from the set of microprocessor-readable instructions; and
  executing the instruction nodes using a multi-threaded execution technique.

15. A microprocessor-readable storage medium containing microprocessor-readable instructions that, when executed using a microprocessor-based system, cause the microprocessor-based system to perform a method for generating an electronic document in a second form, the method comprising:
  receiving a set of at least two executable instruction nodes for generating the electronic document in a first form from a program memory, at least one instruction node comprising at least one child node such that each child node has a depth of nesting;
  for each depth of nesting,
    if an executable instruction node is eligible for caching, comparing a cache key value associated with the eligible executable instruction node with a cache key value stored in a cache memory and associated with a data item;
    if the cache key value associated with the eligible executable instruction node matches the cache key value stored in the cache memory, retrieving the data item with the cache key value stored in the cache memory; and
    inserting the received data item into the first form of the electronic document to replace the eligible instruction node;
  repeating at a different depth of nesting until the second form of the electronic document is generated, the first form being replaceable by the second form to enable generation of the electronic document faster from the second form than from the first form.

16. The microprocessor-readable storage medium of claim 15, containing further microprocessor-readable instructions that, when executed using the microprocessor-based system, cause the microprocessor-based system to calculate the cache key value associated with the instruction node.

17. The microprocessor-readable storage medium of claim 15, wherein the cache key value associated with the instruction node is encoded in the instruction node.

18. The microprocessor-readable storage medium of claim 15, containing further microprocessor-readable instructions that, when executed using the microprocessor-based system, cause the microprocessor-based system to, when the cache key value associated with the instruction node does not match the stored cache key value:
  execute the at least one microprocessor-readable instruction of the instruction node to obtain a result;
  generate at least a portion of the electronic document as a function of the result; and
  store the result as a data item in the cache memory.

19. The microprocessor-readable storage medium of claim 15, containing further microprocessor-readable instructions that, when executed using the microprocessor-based system, cause the microprocessor-based system to identify the instruction node as not eligible for caching if the instruction node contains a microprocessor-readable instruction designating the instruction node as not eligible for caching.

20. The microprocessor-readable storage medium of claim 19, containing further microprocessor-readable instructions that, when executed using the microprocessor-based system, cause the microprocessor-based system to, in response to identifying the instruction node as not eligible for caching:
  execute the at least one microprocessor-readable instruction of the instruction node to obtain a result; and
  generate at least a portion of the electronic document as a function of the result without storing the result as a data item in the cache memory.

21. The microprocessor-readable storage medium of claim 15, containing further microprocessor-readable instructions that, when executed using the microprocessor-based system, cause the microprocessor-based system to:

receive a plurality of executable instruction nodes from the program memory; and execute the instruction nodes using a multi-threaded execution technique.

22. The system of claim 1, in which the system repeats processing of instruction nodes in parallel for all instruction nodes having equal depth of nesting.

23. The system of claim 1, in which the system repeats processing of instruction nodes for nodes having a greater depth of nesting before nodes having a lesser depth of nesting.

24. The system of claim 1, in which the system repeats processing of instruction nodes for nodes having a lesser depth of nesting before nodes having a greater depth of nesting.

25. The system of claim 1, in which the interpreter subsystem is additionally configured to accept runtime created instruction nodes during processing.

26. The system of claim 25, in which the runtime created instruction nodes are at least partially the output of existing instruction nodes.

27. The method of claim 8, in which (b) is performed in parallel for all instruction nodes having equal depth of nesting.

28. The method of claim 8, in which (c) is performed for nodes having a greater depth of nesting before nodes having a lesser depth of nesting.

29. The method of claim 8, in which (c) is performed for nodes having a lesser depth of nesting before nodes having a greater depth of nesting.

30. The method of claim 8, in which the interpreter subsystem accepts runtime created instruction nodes during processing.

31. The method of claim 30, in which the runtime created instruction nodes are at least partially the output of existing instruction nodes.

32. The microprocessor-readable storage medium of claim 15, in which the instructions, when executed using the microprocessor-based system, cause processing of instruction nodes in parallel for all instruction nodes having equal depth of nesting.

33. The microprocessor-readable storage medium of claim 15, in which the instructions, when executed using the microprocessor-based system, cause a repeated processing of instruction nodes for nodes having a greater depth of nesting before nodes having a lesser depth of nesting.

34. The microprocessor-readable storage medium of claim 15, in which the instructions, when executed using the microprocessor-based system, cause a repeated processing of instruction nodes for nodes having a lesser depth of nesting before nodes having a greater depth of nesting.

35. The microprocessor-readable storage medium of claim 15, in which the instructions, when executed using the microprocessor-based system, cause the acceptance of runtime created instruction nodes during processing.

36. The microprocessor-readable storage medium of claim 35, in which the runtime created instruction nodes are at least partially the output of existing instruction nodes.

* * * * *